US012638811B2

(12) United States Patent
Favre

(10) Patent No.: US 12,638,811 B2
(45) Date of Patent: May 26, 2026

(54) METHOD FOR OPTIMIZING AN OPERATION OF SETTING AND WINDING A WATCH, AND DEVICE FOR IMPLEMENTATION OF SAME

(71) Applicant: The Swatch Group Research and Development Ltd, Marin (CH)

(72) Inventor: Jérôme Favre, Neuchâtel (CH)

(73) Assignee: Montres Breguet SA, L'Abbaye (CH)

( * ) Notice: Subject to any disclaimer, the term of this patent is extended or adjusted under 35 U.S.C. 154(b) by 419 days.

(21) Appl. No.: 18/331,672

(22) Filed: Jun. 8, 2023

(65) Prior Publication Data

US 2024/0126214 A1 Apr. 18, 2024

(30) Foreign Application Priority Data

Oct. 17, 2022 (EP) .................................... 22201985

(51) Int. Cl.
*G04D 7/12* (2006.01)
*G04D 7/00* (2006.01)

(52) U.S. Cl.
CPC ........... *G04D 7/1214* (2013.01); *G04D 7/001* (2013.01)

(58) Field of Classification Search
CPC ......... G04D 7/00; G04D 7/001; G04D 7/1214
See application file for complete search history.

(56) References Cited

U.S. PATENT DOCUMENTS

| | | | | |
|---|---|---|---|---|
| 9,292,000 | B2 * | 3/2016 | Lamarche | G04B 5/00 |
| 2021/0011432 | A1 * | 1/2021 | Favre | G04D 7/1278 |
| 2021/0181687 | A1 * | 6/2021 | Favre | G04C 1/082 |

FOREIGN PATENT DOCUMENTS

EP 3 537 233 A1 9/2019

OTHER PUBLICATIONS

European Search Report for 22 20 1985 dated, Mar. 15, 2023.

* cited by examiner

*Primary Examiner* — Edwin A. Leon
*Assistant Examiner* — Jason M Collins
(74) *Attorney, Agent, or Firm* — Sughrue Mion, PLLC

(57) ABSTRACT

A method for optimising an operation of setting and winding a watch or the timepiece movement thereof including initially making a measurement of the operation of the watch or of the timepiece movement followed by an activation of an operation of low-amplitude reciprocating movements of the watch or of the timepiece movement on the jig of the device, or initially implementing an activation of an operation of low-amplitude reciprocating movements of the watch or of the timepiece movement before making a measurement of the operation of the watch or of the timepiece movement, and resuming low-amplitude reciprocating movements in phase or a synchronisation step being implemented at the end of the first two steps. The first oscillating signal of movements includes a change in sign of the absolute rotation speed in each successive oscillation period, the oscillating signal having a positive part and a negative part of the rotation speed.

7 Claims, 2 Drawing Sheets

METHOD FOR OPTIMIZING AN OPERATION OF SETTING AND WINDING A WATCH, AND DEVICE FOR IMPLEMENTATION OF SAME

CROSS REFERENCE TO RELATED APPLICATIONS

The present application is based on, and claims priority from the prior European Patent Application No. 22201985.3, filed on Oct. 17, 2022, the entire contents of which are incorporated herein by reference.

TECHNICAL FIELD OF THE INVENTION

The invention relates to a method for optimising an operation of setting and winding a watch mainly in an open loop system.

The invention also relates to a control device for implementing the optimisation method.

TECHNOLOGICAL BACKGROUND

Various types of smart winding mechanism are known, which can be classified in two categories of winding mechanism. Firstly, they may be smart winding mechanisms with reading of the watch time by vision. In the present case, closed loop servo-control is implemented, which enables the watch to be perfectly in time in the long term with 100% of the intrinsic error corrected. Secondly, they may be smart winding mechanisms with solely a microphone for listening to the escapement noise. In the present case, open loop servo-control is implemented, the watch having long-term drift.

The first category of smart winding mechanisms cited above gives perfect results, but with the drawback of a certain complexity and a high cost partly in relation to the use of vision for reading the time.

The second category of smart winding mechanism cited above is simpler and less expensive, but on the other hand there is drift in the long term, which may be problematic. The setting method in this second category of smart winding mechanism is composed of the following phases:

- A stabilisation pause of 30 seconds for example.
- An acoustic-measurement period of approximately 5 seconds.
- According to the result of the acoustic measurement, the winding mechanism winds a certain number of preprogrammed turns, in the present case this may be 100 turns, which may last for several minutes before passing to phase 1 again.

The document EP 3 410 235 A1 describes a method for setting the running of a watch with an oscillator arranged to generate an oscillation at a nominal frequency. The servo-control system comprises a master oscillator generating an excitation oscillation at an excitation frequency, which is equal to a nominal frequency, or to an integer multiple of this nominal frequency. The watch is subjected again to an excitation oscillation or to a modulated movement, generated by the master oscillator, during a transition phase after which the oscillator of the watch stabilises at the excitation frequency. A winding mechanism for mechanical or automatic watches, arranged to move a support on which such a watch is fixed, is incorporated in the servo-control.

The running error drifts in particular according to the letting down of the barrel, but also, non-exhaustively, according to the variations in the environment, the temperature, the humidity, or the like, to wear on the various wheels, and to the degradation of the lubricants over time.

The concern to control the state error is added to that of controlling the running error.

Automatic winding mechanisms are designed for winding mechanical or automatic or manual watches, but merely move the oscillating mass, or turn the crown, to reload the barrel, without correction either to the running or to the state of the watch. When the user leaves their watch for a long time on such a winding mechanism, the time displayed drifts in a continuous and uncontrolled manner.

SUMMARY OF THE INVENTION

The present invention therefore proposes to combine both an operation of maintaining or setting by fluctuation with a small movement defined as a gentle shaking (defined “dorlotage” in French terminology) of the watch and the clockwork movement thereof generally of the mechanical type with a traditional operation of winding its mechanical energy source, i.e. its barrel.

To do this, a method for optimising the setting and winding of at least one mechanical or automatic or manual watch is proposed according to the features defined in independent claim 1.

To do this, a servo-control device for implementing the optimisation method is also proposed according to the features of independent claim 7.

One advantage of the optimisation method lies in the fact that the setting and winding are implemented in an open-loop system. Mainly a fine adjustment is made by a so-called gentle shaking operation that consists of moving the watch at a variable and oscillating speed with a positive speed followed by a negative speed over each oscillation of the gentle shaking speed in combination with a mean speed of winding the watch.

One advantage of said optimisation method lies in the fact that provision is made for detecting the presence of a mechanical or automatic watch or of a timepiece movement in activity in the servo-control device. After such detection, there is an acoustic or vibratory measurement step following the presence of the watch or of the timepiece movement in activity in a servo-control device. This measurement can make it possible to detect the type of watch or the timepiece movement thereof in the device, or to detect an error in running of the watch of the timepiece movement in activity in the device. At the time of the measurement step or just after this measurement step, there is an operation of setting in movement the watch or the timepiece movement thereof disposed on a table or a jig of the device. The table or the jig on which the watch or the timepiece movement is disposed is able to turn with respect to a central axis perpendicular to the table or to the jig, preferably at a defined mean speed.

An additional advantage of the optimisation method lies in the fact that, at the time of the gentle shaking activity, the watch or the timepiece movement placed on the table or the jig of the device makes low-amplitude reciprocating movements about a rotation axis parallel to or coincident with the central rotation axis of the winding mechanism. The mean rotation speed of the table or of the jig makes reference as a straight line about which the watch or the timepiece movements oscillates, for example in sinusoidal form. Thus, the oscillating signal in the gentle shaking phase comprises a change in sign of the rotation speed in each period with a positive part and a negative part. The preferably maximum amplitude of the absolute value of the positive part must be different from the preferably maximum amplitude of the absolute value of the negative part, which leads to ensuring no drift in time for the watch or the timepiece movement in activity.

Advantageously, with the acoustic or vibratory measurement, the type of watch in the servo-control device can be determined, since the beat varies from one watch to another for example from 3 to 6 Hz.

BRIEF DESCRIPTION OF THE FIGURES

The aims, advantages and features of the method for optimising the setting and winding of a mechanical or automatic watch or of the timepiece movement thereof will appear more clearly in the following description non-limitatively, with reference to the drawings in which.

DETAILED DESCRIPTION OF THE INVENTION

In the following description, a method for optimising the operation of a mechanical or automatic watch or of the timepiece movement thereof is described. All the components of the device for implementing the method for optimising the operation of an automatic mechanical watch or of the timepiece movement thereof, which are well known in the prior art, will be described only briefly in relation to the various steps of the optimisation method.

The present invention is mainly based on the device and method for adjusting the running and correcting the state of a preferably mechanical or automatic watch, which is described in the document EP 3 410 235 A1, which is incorporated here by reference.

Figure 1:
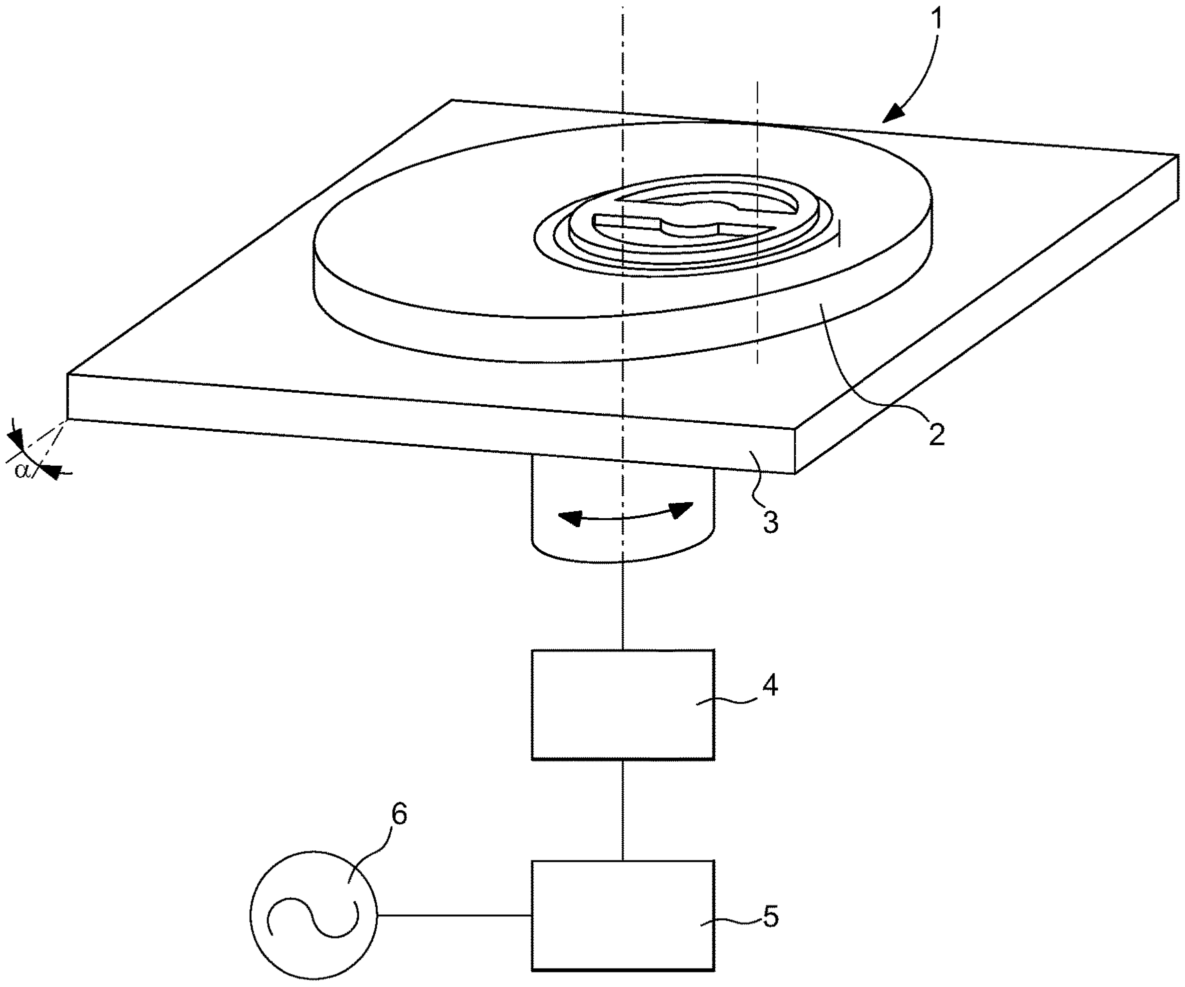
FIG. 1 shows schematically a device and the movement thereof for optimising or adjusting the running of a watch or of the timepiece movement, the device including a reference oscillator, a frequency converter for actuating a driver at an excitation frequency for driving a jig or a table supporting the watch or the timepiece movement that includes the usual oscillator according to the invention.

FIG. 1 shows precisely all the essential components of the device on which the watch 2 or the timepiece movement is placed or secured, for implementing all the steps of the optimisation method of the present invention. For the optimisation method of the present invention, provision is made in particular for combining an operation of oscillating movement at low amplitude, in comparison with the winding of a traditional oscillating mass of the mechanical energy source, such as the barrel of a watch, and this winding. This operation of oscillating movement at low amplitude is defined under the gentle shaking terminology, i.e. maintenance and setting of the timepiece movement. This term gentle shaking is therefore repeated throughout the description and as claim features.

The object of the present invention therefore consists in making a setting or servo-control in open loop, without effecting vision of the timepiece movement in operation, i.e. in activity. Said mechanical watch 2 can be wound by a traditional oscillating mass for an operation of winding the barrel (energy source reserve). Provision is therefore made, as indicated above, for implementing an operation of gentle shaking the mechanical or automatic watch in addition to a traditional winding operation for example of the barrel. As explained subsequently, by means of the gentle shaking and the winding of the watch 2 placed on the jig or table 3, the frequency of operation of the oscillator internal to the movement can be maintained very precisely over a very long period of activity of the gentle shaking and winding operations, and this at lower cost.

FIG. 1 has already been partially described in the document of the prior art EP 3 410 235 A1 cited above. The servo-control device includes a reference oscillator 6, and a frequency converter 5 if necessary, for actuating a driver 4 for example at the excitation frequency NE.

This driver 4 imparts a movement, in particular reciprocating, about a reference axis, to a jig or table 3 that supports the watch 2 to be servo-controlled, with preferably the axis of the oscillating wheel of the usual oscillator 1 of the watch 2 being parallel to or coincident with the reference axis.

The oscillation angle $\alpha$ is a function of time, which is periodic. In particular it is of the form: $\alpha(t)=A\cdot\sin(2\pi\cdot NE)$, or similar. It may also follow a square, sawtooth or other cycle. The gentle shaking operation described below will make reference to this oscillation angle dependent on time and periodic.

Such a servo-control device makes it possible to adjust the running of the watch 2, by choosing this particular excitation frequency NE in relation to the nominal frequency NO. And this same device may also be used, not at the excitation frequency NE, but at a correction frequency NC, as will be seen below.

More particularly, this servo-control device includes driving means, which are arranged for controlling the excitation oscillation of the master oscillator, and which are interfaced with means for measuring the running error EM of the watch, that this servo-control device includes.

In general terms, the driving means, main driving means and central driving means described here may consist of a computer, a calculator, a programmable automaton, an integrated circuit, or any other artificial-intelligence means adapted to the application.

In a particular implementation, this servo-control device includes an automatic winder or driver 4 for a mechanical or automatic watch 2, to which at least one jig or table 3 for receiving the watch or timepiece movement or the like is secured. The servo-control device includes, at this jig, excitation means that are arranged for subjecting the entire watch to an excitation oscillation generated by the master oscillator, and/or includes driving means arranged for subjecting the entire watch to a modulated movement generated by this master oscillator or a rotation movement about a central axis.

Preferably, the servo-control device may comprise aforementioned driving means that are able firstly to rotate the table of the winding mechanism 4 on a central rotation axis, generally perpendicular to the plane of the table or jig 3, and secondly, in a gentle shaking operation, to turn the watch or the timepiece movement thereof on the table or jig 3 on another rotation axis, which must be parallel to or coincident with the central rotation axis. The rotation of the table 3 of the winding mechanism 4 on the central rotation axis is implemented at a defined mean speed, whereas, in the gentle shaking operation, low-amplitude reciprocating movements are made about the other rotation axis so as to generate an oscillating speed signal. The oscillating signal in the gentle shaking phase thus comprises a change in sign of the rotation speed in each period with a positive part and a negative part.

More particularly, at least one measurement of the running error is made, before and/or after the stabilisation thereof for implementing this method. More particularly again, a display or a publishing of the running error value measured is implemented, on a display or publishing means provided for this purpose.

It will be understood that the running adjustment is temporary, it is a case of a transient servo-control, as long as the watch remains under the effect of the excitation oscillations generated by the master oscillator of the servo-control device.

It is important to note that this first development makes it possible to compensate both for running fast and running slow: this is because some watches come from the factory with a setting designed for running fast, whereas others have a setting centred on the null value, which means that these watches may equally well run fast or slow. Thus, it is therefore possible to retard a watch that is running fast, or to advance a watch that is running slow. It is notable that the running of a watch that is already correctly set is not degraded.

This servo-control can be done in addition to the optimum winding of the movement, either in sequence, or simultaneously.

Figure 2:
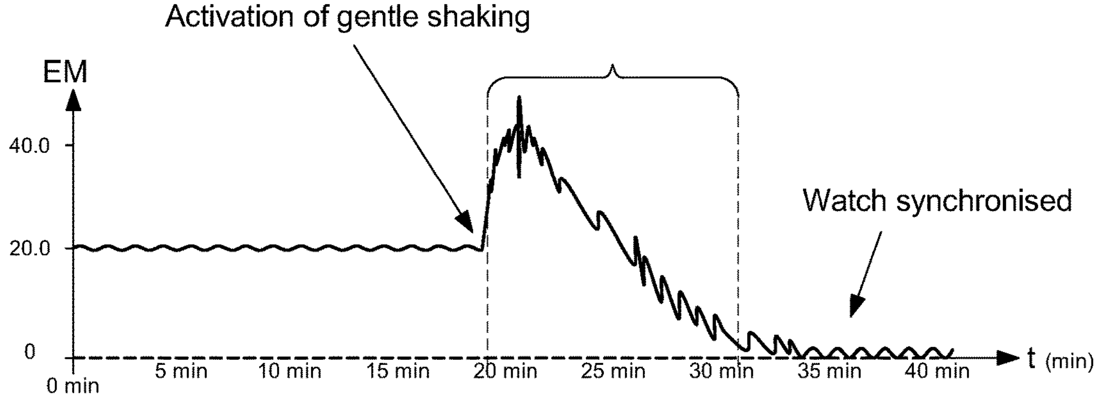
FIG. 2 shows a diagram for the change in the running error, on the Y-axis showing the speed of the timekeeping in small movement (seconds per day), as a function of the time on the X-axis graduated in minutes, of the watch, from an initial instant, to an abrupt ramp corresponding to the activation of the servo-control device and to an oscillation of the jig or of the table at an excitation frequency, said ramp being followed by a transition or synchronisation phase, to achieve and maintain a zero error in the time of the watch according to the method for optimising the operation of the watch according to the invention.

To describe the optimisation method of the present invention, reference is made to FIG. 2, which shows a diagram for the change in the running error EM, on the Y-axis showing the speed of the timekeeping in small movement (seconds per day), as a function of the time on the X-axis graduated in minutes, of the watch. This can be done from an initial instant, to an abrupt ramp corresponding to the activation of the gentle shaking of the servo-control device and to an oscillation of the jig or of the table at a defined excitation frequency. Said ramp is followed by a transition or synchronisation phase, to achieve and maintain a zero error in the time of the watch according to the method for optimising the operation of the watch according to the invention.

The present invention recommends using open-loop servo-control for reducing the costs of maintaining the oscillation frequency of the mechanical watch. In this regard, the following steps (several phases) can be taken into account:

- A stabilisation pause of sufficient duration for the resonator of the watch to have an amplitude independent of the excitation created by the winding mechanism. This may be a duration of the order of 30 seconds.
- A measurement period, which may preferably be an acoustic or vibratory measurement of several seconds, for example approximately 5 seconds, as can be noted at the moment of activation of the gentle shaking or just before the activation of the gentle shaking.
- According to the result of the measurement,
  - a. Either the winding mechanism winds a certain number of preprogrammed turns (for example 100 turns), which may last for several minutes, and then it passes to phase 1 again. This is what occurs in the device described in the document of the prior art EP 3 410 235 A1.
  - b. Or it goes into and continues in gentle shaking mode for a certain preprogrammed time, typically 1 hour, and then it can go into phase 1 or into phase 2 again. In this phase 3b, there may be a synchronisation with respect to the reference oscillator of the watch so as to obtain a running error equal to zero.

For the optimisation method of the present invention, the above phase 3b is implemented, so that the watch does not drift after the synchronisation. Thus, according to the optimisation method of the present invention, it is necessary to have a change in sign of the absolute rotation speed in the gentle shaking operations with respect to a fixed reference frame of the table of the device. This means that the speed signal of the gentle shaking of sinusoidal or sawtooth shape or by pulses of periodic rectangular shape or of another shape, must have a change in sign of the speed over a part of each oscillation period with respect to the fixed reference frame of the table or jig of the device. It can be depicted as if for example a succession of two steps forward and for example one step backward is made at each oscillation period over time.

This is therefore necessary for maintaining a precise frequency by the operation of gentle shaking the oscillation frequency of the timepiece movement following for example a synchronisation operation depicted at the end of the steep ramp phase of the signal in acoustic or vibratory measurement phase.

Naturally it should be noted that, according to the optimisation method of the present invention, there must be at least phases 2 and 3. This means that it is necessary to have a measurement signal that is specified here as a signal of an acoustic measurement, but without restriction as to the fact that it may also be case of a vibration measurement or an ultrasound measurement for listening to the movement of the watch or of its timepiece movement on the table or the jig of the device. This measurement is made from the start of the gentle shaking and of the winding of the watch or just before the activation of the gentle shaking and winding of the watch. It may also be a case of another type of measurement.

Figure 3:
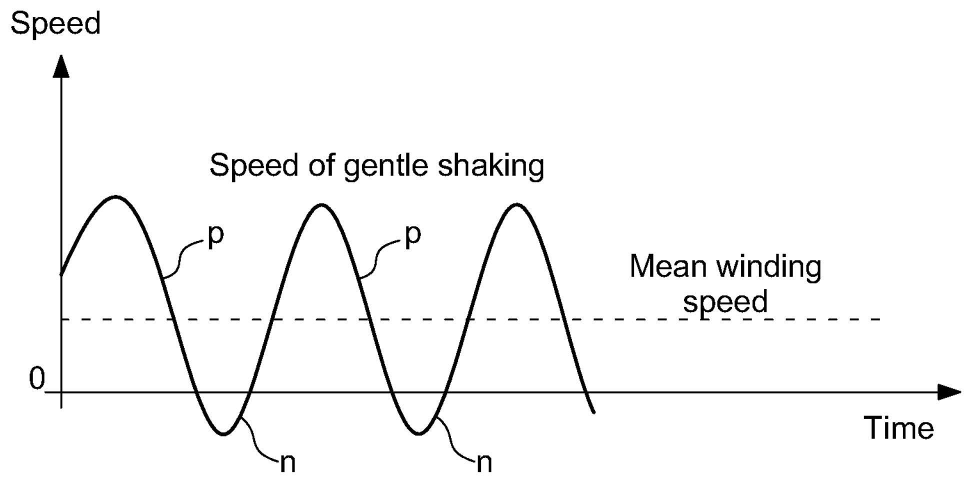
FIG. 3 shows the graph of the so-called gentle shaking signal combined with the traditional winding in particular by an oscillating mass of the mechanical energy source such as the barrel according to the invention.

In FIG. 3, a graph is shown of the so-called gentle shaking signal combined with the traditional winding in particular by an oscillating mass of the mechanical energy source such as the barrel according to the invention. In this FIG. 3, the gentle shaking signal is of periodic sinusoidal shape. It is shown combined with the mean speed of the winding mechanism of the watch, i.e. in the case of a mechanical watch of the oscillating mass winding the barrel.

The winding mechanism rotates, about a central axis, the table or the jig on which the mechanical or automatic watch or the timepiece movement in activity is mounted. In addition, there is an operation of gentle shaking of the watch or of the timepiece movement about another rotation axis parallel to or coincident with the central rotation axis of the winding mechanism. This gentle shaking operation is effectively an operation of low-amplitude reciprocating movements generating a gentle shaking oscillating signal around the mean speed of the winding mechanism.

Certain parts of the gentle shaking oscillating signal for each oscillation period are on a positive side p of the signal, whereas other parts of the gentle shaking oscillating signal are on a negative side n. It is of course by means of this change of sign on each oscillation period of the gentle shaking signal that the watch can be maintained without time drift over time with normally a difference with respect to the real time equal to zero.

Even if the watch goes again into the first phase described above, at the moment of going again into a gentle shaking phase all the time data have been saved, i.e. the setting and maintenance of the exact time have been stored in a memory, for example of a computer, of a calculator, of a programmable automaton or of other computerised means for operating the device on which the watch or the timepiece movement thereof is placed. This essential advantage has never been discovered and described in the prior art, which makes it possible to ensure correct setting and maintenance of the exact time in any watch placed on the servo-control device described with reference to FIG. 1.

It should be noted that, in the devices of the prior art, the operation of maintenance and setting with small movement never exhibited a change in sign of the speed of the oscillating signal as for the method of the present invention. And it is especially by means of this change in sign of the speed in each oscillation period of the oscillating signal of the gentle shaking operation that the watch always has the exact time without time drift over time.

Naturally, as the oscillating signal of the gentle shaking operation oscillates at the value of the mean speed of the winding mechanism, it is also necessary to make provision for the oscillating signal to have sufficient amplitude to pass to a negative speed value and return to a positive value subsequently on each successive oscillation period. In addition, the amplitude of the absolute value of the positive part of the oscillating signal must be different from the amplitude of the absolute value of the negative part. Principally, the maximum amplitudes of the absolute values of the positive and negative parts must always be different. It is not only in this case that there is not a time drift over time in the long term and that the watch remains at the exact time over a long period, and which reduces costs.

Figure 4:
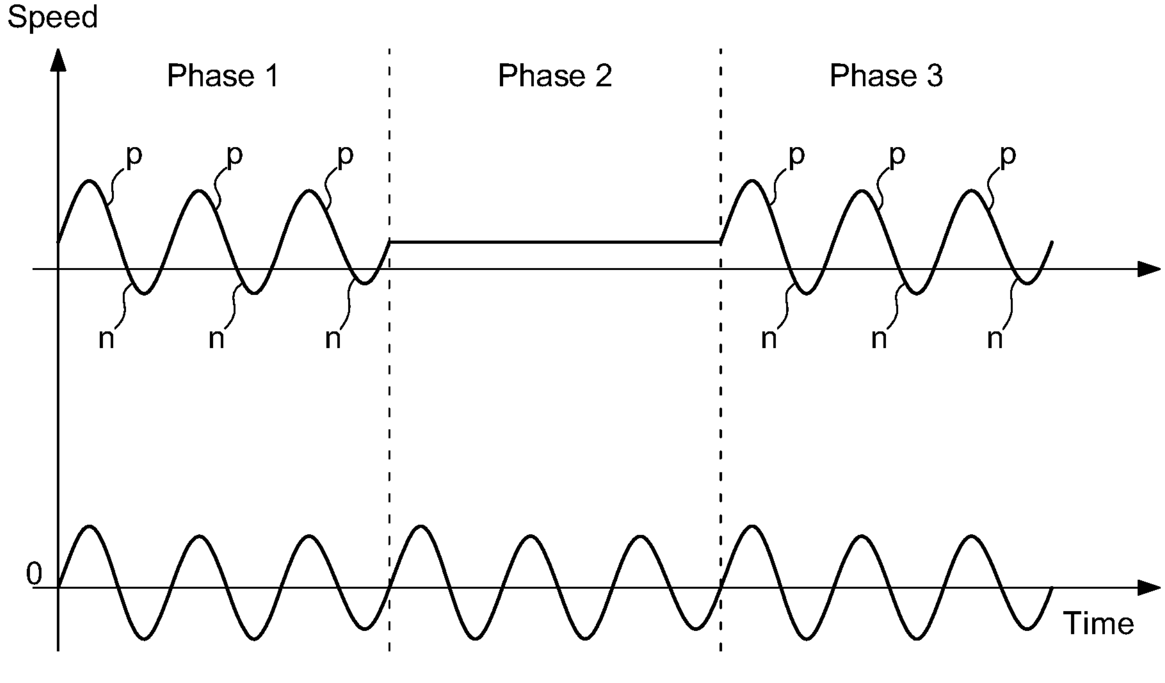
FIG. 4 shows a graph of various phases of setting and winding a mechanical or automatic watch according to the present invention.

FIG. 4 shows a graph of various phases of setting and winding a mechanical or automatic watch of the optimisation method of the present invention.

It is a case mainly of an improvement following what happens in time after the first phases as shown intrinsically in FIG. 2. As described above in the initial phases, there may first of all be a measurement, such as an acoustic measurement, in a stabilisation phase, or directly the activation of the gentle shaking phase before the acoustic measurement is made. After this phase, once the time difference is reduced to a minimum, there may be a synchronisation phase.

It should however be noted that it is practically always necessary to have a stabilisation phase and a measurement phase during which the winding mechanism does not gentle shake in order to be able to measure in which state of load the barrel of the watch is. When the gentle shaking (winding and gentle shaking) is resumed, it is however possible to do it in an optimised manner, i.e. by having counted precisely the elapsed time when gentle shaking has not taken place, and to resume gentle shaking in phase with the spiral balance. In this way, a long period of resynchronisation of the watch with the winding mechanism where the running is impaired is avoided.

Thus, on this FIG. 4, a first phase (Phase 1) in which there is an operation of gentle shaking the winding mechanism on the first oscillating signal is shown, with the second oscillating signal shown below the first signal and relating to the spiral balance servo-controlled by the winding mechanism in gentle shaking.

In a second phase (Phase 2), which follows the first phase, a stoppage of the gentle shaking is provided on the first signal so as to be able in this case to make an acoustic or vibratory measurement over a given period. This given period may for example be of the order of 30 seconds for the stabilisation and 4 seconds of measurement. In this second phase, the time between the stoppage of the gentle shaking and a new activation of the gentle shaking on the first signal is calculated.

In the second phase, the second signal below the first signal relates to the fact that the watch continues to operate without having to stop, and therefore said watch resumes its intrinsic running.

In the third phase for the first signal, there is a resumption of the gentle shaking, which is in phase and no longer random since account is taken of the duration of phase 2 with the watch considered synchronised and without time drift. In this third phase, the second signal relates to the spiral balance, which is servo-controlled by the winding mechanism.

All the phases described with reference to FIG. 4 can be repeated while alternating both for the first signal a phase where the winding mechanism gentle shakings followed by a phase of stoppage of the gentle shaking to make the acoustic measurement. In each gentle shaking phase for the first signal, it is noted that the first signal is periodic and generally sinusoidal in shape with, as explained with reference to FIG. 2, a negative part of the first signal and a positive part of the first signal in each oscillation period. By means of the fact that, in the first gentle shaking signal, there is an alternation of negative parts and positive parts of the rotation speed in gentle shaking phase, this makes it possible to guarantee exact precision of the time displayed by the watch over a very long period as long as the watch is disposed in the servo-control device for implementing the optimisation method according to the invention.

Several variant embodiments of the optimisation method can be designed without departing from the context of the scope of the claims presented.

The invention claimed is:

1. A method for optimising an operation of setting and winding a watch or a timepiece movement thereof, disposed on a jig or a table with fixed reference of a servo-control device having means for moving the watch or the timepiece movement for implementing the method, for which the method comprises:

a step of initially making a measurement of an operation of the watch or of a timepiece movement of the watch, followed by an activation of an operation of controlled shaking of the watch or of the timepiece movement on said jig of a servo-control device generating an oscillating signal, or conversely initially implementing an activation of an operation of controlled shaking the watch or the timepiece movement before making a measurement of the operation of the watch or of the timepiece movement; and a step of resuming the controlled shaking in phase with the oscillating signal or a synchronisation step for synchronizing with respect to a reference oscillator of the watch, being implemented at an end of the first two steps, wherein the controlled shaking oscillating signal comprises a change in sign of a rotation speed in each successive oscillation period with respect to a fixed reference frame of the table of the servo-control device turning at a mean speed, the oscillating signal comprising, over each oscillation period, a positive part and a negative part of the rotation speed, an amplitude of an absolute value of the positive part of the oscillating signal, being different from an amplitude of an absolute value of the negative part.

2. The method for optimising an operation of setting and winding a watch or the timepiece movement thereof according to claim 1, wherein the measurement is an acoustic measurement or a measurement of vibrations.

3. The method for optimising an operation of setting and winding a watch or the timepiece movement thereof according to claim 1, wherein, in a first phase of the method, a stabilisation pause is implemented with a duration for a resonator of the watch or of the timepiece movement in activity to have an amplitude independent of an excitation created by a winding mechanism, wherein, in a second phase of the method, there is an acoustic or vibratory measurement period of a number of seconds, and wherein a third phase in controlled shaking mode is implemented during a certain preprogrammed time with a search for synchronisation with respect to the reference oscillator of the watch so as to obtain a running error equal to zero.

4. The method for optimising an operation of setting and winding a watch or the timepiece movement thereof according to claim 1, wherein, in operation of the servo-control device, in a first phase an operation of controlled shaking of a winding mechanism is implemented, generating a first oscillating signal of the controlled shaking and a second oscillating signal in relation to a spiral balance of the watch controlled by the winding mechanism in controlled shaking, wherein, in a second phase, a stoppage of the controlled shaking operation and an acoustic or vibratory measurement are implemented during a given period, the second oscillating signal remaining in activity, and wherein, in a third phase, the controlled shaking operation is activated while being in phase with the second oscillating signal.

5. The method for optimising an operation of setting and winding a watch or the timepiece movement thereof according to claim 4, wherein a duration of stabilisation in the second phase is 30 seconds, while a duration of the acoustic or vibratory measurement is 4 seconds.

6. A servo-control device for implementing the optimisation method according to claim 1, wherein the servo-control device comprises driving means that are intended firstly to rotate on a central rotation axis of a table or a jig of a winding mechanism on which a watch or a timepiece movement is disposed, and intended secondly to rotate, in a controlled shaking operation, the watch or its timepiece movement on the table or the jig on an other rotation axis, which must be parallel to or coincident with the central rotation axis, and wherein, in the controlled shaking operation, low-amplitude reciprocating movements are intended to be made about the other rotation axis to generate an oscillating speed signal, the oscillating signal comprises a change in sign of a rotation speed in each successive oscillation period with respect to a fixed reference frame of the table, the oscillating signal comprising, over each oscillation period, a positive part and a negative part of the rotation speed, an amplitude of an absolute value of the positive part of the oscillating signal, being different from an amplitude of an absolute value of the negative part.

7. The servo-control device according to claim 6, wherein the rotation of the table or of the jig of the winding mechanism on the central rotation axis perpendicular to the table or to the jig is arranged to be implemented at a defined mean speed.

* * * * *